(12) United States Patent
Usami et al.

(10) Patent No.: US 9,987,788 B2
(45) Date of Patent: Jun. 5, 2018

(54) APPARATUS FOR FORMING HANDLE-EQUIPPED CONTAINER, TRANSPORT JIG, AND CONTAINER HANDLE

(71) Applicant: NISSEI ASB MACHINE CO., LTD., Nagano (JP)

(72) Inventors: Masayuki Usami, Nagano (JP); Atsushi Nishiyama, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 260 days.

(21) Appl. No.: 14/894,647

(22) PCT Filed: May 29, 2014

(86) PCT No.: PCT/JP2014/064233
§ 371 (c)(1),
(2) Date: Nov. 30, 2015

(87) PCT Pub. No.: WO2014/192854
PCT Pub. Date: Dec. 4, 2014

(65) Prior Publication Data
US 2016/0129622 A1 May 12, 2016

(30) Foreign Application Priority Data

May 30, 2013 (JP) ................................. 2013-114640

(51) Int. Cl.
*B29C 49/20* (2006.01)
*B29C 49/42* (2006.01)
(Continued)

(52) U.S. Cl.
CPC .......... *B29C 49/4205* (2013.01); *B29C 49/20* (2013.01); *B29C 49/28* (2013.01);
(Continued)

(58) Field of Classification Search
CPC ........ B29C 49/4205; B29C 2049/4221; B29C 49/4215; B29C 2049/2039;
(Continued)

(56) References Cited

U.S. PATENT DOCUMENTS

| 4,952,133 A * | 8/1990 | Hasegawa | ............... B29C 49/20 |
| | | | 215/383 |
| 8,851,312 B2 * | 10/2014 | Itokawa | ............... B65D 23/106 |
| | | | 215/396 |

(Continued)

FOREIGN PATENT DOCUMENTS

| CN | 1180612 A | 5/1998 | |
| FR | 2796591 A1 * | 1/2001 | ............. B29C 49/20 |

(Continued)

OTHER PUBLICATIONS

Partial machine translation of FR2796591A1 printed Jan. 2001 obtained from the espace website.*
International Search Report dated Jul. 15, 2014 with International application No. PCT/JP2014/064233.
Taiwanese Office Action in Application No. 10620670680, dated Jun. 27, 2017.

*Primary Examiner* — Robert B Davis
(74) *Attorney, Agent, or Firm* — David L. Hoffman; Hoffman Patent Group

(57) ABSTRACT

An apparatus for forming a handle-equipped container comprises: a transport section 150 provided with a transport line 151, the transport line 151 alternately transporting a first transport jig 152 holding a preform, and a second transport jig 153 holding a container handle 20, the transport section 150 transporting the preform 200 and the container handle 20 to a blow molding section 140 along the transport line 151; and a supply section 160 for lowering the container handle 20, held in an inverted state, and supplying the container handle 20 to the second transport jig 153. The second transport jig 153 supports at least a pair of opposite side surfaces of the container handle 20.

12 Claims, 14 Drawing Sheets

(51) Int. Cl.
   *B65D 23/10*   (2006.01)
   *B29C 49/28*   (2006.01)
   *B29L 31/00*   (2006.01)
   *B29C 49/06*   (2006.01)
   *B29K 67/00*   (2006.01)

(52) U.S. Cl.
   CPC ............ *B65D 23/106* (2013.01); *B29C 49/06* (2013.01); *B29C 2049/2017* (2013.01); *B29C 2049/2039* (2013.01); *B29C 2049/2078* (2013.01); *B29K 2067/003* (2013.01); *B29L 2031/712* (2013.01); *B29L 2031/7158* (2013.01)

(58) Field of Classification Search
   CPC .... B29C 2049/2078; B29C 2049/2082; B29C 2049/4869; B29C 2049/4879; B65D 23/106
   See application file for complete search history.

(56) References Cited

U.S. PATENT DOCUMENTS 9,511,532 B2 * 12/2016 Ogihara .................. B29C 49/20
2001/0042731 A1 * 11/2001 Itokawa ............... B65D 23/106
                                                                215/398

FOREIGN PATENT DOCUMENTS

| JP | 05-000446 | 1/1993 |
| JP | 06-064027 | 3/1994 |
| JP | 09-085811 | 3/1997 |
| JP | 09-300440 | 11/1997 |
| JP | 11070569 A | 3/1999 |
| JP | 2001-328635 | 11/2001 |
| JP | 3599851 | 9/2004 |
| JP | 2008-179400 | 8/2008 |
| WO | WO2013/027692 | 2/2013 |

* cited by examiner

APPARATUS FOR FORMING HANDLE-EQUIPPED CONTAINER, TRANSPORT JIG, AND CONTAINER HANDLE

This application is a U.S. national stage application of International Patent Application No. PCT/JP2014/064233, having an international filing date of May 29, 2014, which designated the United States and which claims priority from Japanese Patent Application No. 2013-114640, filed on May 30, 2013, the entirety of both of which are incorporated herein by reference.

TECHNICAL FIELD

This invention relates to an apparatus for forming a handle-equipped container, the apparatus being adapted to form handle-equipped containers while continuously transporting injection-molded preforms and container handles; a transport jig; and a container handle. More particularly, the invention relates to a technology for continuously transporting preforms and container handles.

BACKGROUND ART

As containers using resin materials such as polyethylene terephthalate (PET), there have so far been those integrated with handles for easier handling. Such a handle-equipped container is formed by disposing a handle for a container (will be hereinafter referred to as a container handle), together with a preform, within a blow cavity mold, and blow molding the preform in this state.

Various methods are available for arranging the preform and the container handle within the blow cavity mold. An example of forming apparatuses for use in these methods is configured to insert a pin of a plug-in holder into a locking portion of a handle (container handle) to hold the handle individually on the plug-in holder, and move the plug-in holder in this state to dispose the handle within the blow cavity mold (see Patent Document 1).

PRIOR ART DOCUMENTS

Patent Documents

Patent Document 1 Japanese Patent No. 3599851

SUMMARY OF THE INVENTION

Problems to be Solved by the Invention

With the above-mentioned forming apparatus, in order to carry the container handle into the blow cavity mold independently of the preform, there is need to adjust the placement of the container handle for each carry-in.

In forming a plurality of handle-equipped containers simultaneously by the blow cavity molds, moreover, a plurality of container handles have to be inserted individually into the respective blow cavitymolds, thus posing the possibility of making the arrangement of the container handles more unstable. In addition, if the container handles are carried into the blow cavity molds independently of the preforms, a blow molding cycle time is likely to lengthen.

In transporting the container handle while holding it by the pin, as described in Patent Document 1, positional displacement of the container handle is apt to occur and, when the container handle is carried into the blow cavity mold, its placement may need to be adjusted. Furthermore, when the container handle is to be held by the holder, the problem may arise that the pin cannot be inserted into the locking portion (hole) of the container handle, so that the container handle slips off.

The present invention has been accomplished in light of the above-mentioned circumstances. It is an object of this invention to provide an apparatus for forming a handle-equipped container, the apparatus being capable of holding a container handle relatively easily and reliably, and transporting a preform and the container handle reliably to a blowmolding section; a transport jig; and the container handle.

Means for Solving the Problems

A first aspect of the present invention for solving the above problems lies in an apparatus for forming a handle-equipped container, the apparatus comprising: a blow molding section for blow molding a preform, with the preform and a container handle being arranged within a blow cavity, to form a handle-equipped container; a transport section provided with a transport line, the transport line alternately transporting a first transport jig holding the preform, and a second transport jig holding the container handle, the transport section transporting the preform and the container handle to the blow molding section along the transport line; and a supply section for lowering the container handle, held in an inverted state, and supplying the container handle to the second transport jig, the second transport jig supporting at least a pair of opposite side surfaces of the container handle to hold the container handle.

A second aspect of the present invention lies in the apparatus for forming a handle-equipped container according to the first aspect, wherein the second transport jig includes a pair of engaging portions provided to protrude upwardly from a jig body thereof for engaging the opposite side surfaces of the container handle.

A third aspect of the present invention lies in the apparatus for forming a handle-equipped container according to the second aspect, wherein the container handle is provided with inwardly recessed grooves at the opposite side surfaces thereof, and the second transport jig has the engaging portions engaged with the grooves to hold the container handle.

A fourth aspect of the present invention lies in the apparatus for forming a handle-equipped container according to any one of the first to third aspects, wherein the transport line has a curved transport portion curved with a predetermined radius, and the supply section is provided in correspondence with the curved transport portion, and lowers the container handle while rotating the container handle in synchronization with a rotation of the second transport jig in the curved transport portion, thereby supplying the container handle to the second transport jig.

A fifth aspect of the present invention lies in a transport jig for use in a transport device for transporting a preform and a container handle to a blow molding section along a transport line, the blow molding section blow-molding the preform, with the preform and the container handle being arranged within a blow cavity, to form a handle-equipped container, wherein the transport jig supports at least a pair of opposite side surfaces of the container handle to hold the container handle.

A sixth aspect of the present invention lies in the transport jig according to the fifth aspect, further comprising: a jig body, and a pair of engaging portions provided to protrude upwardly from the jig body for engaging the opposite side surfaces of the container handle.

A seventh aspect of the present invention lies in the transport jig according to the sixth aspect, wherein the container handle is provided with inwardly recessed grooves at the opposite side surfaces thereof, and the engaging portions are engaged with the grooves to hold the container handle.

An eighth aspect of the present invention lies in a container handle, comprising: a handle body to be disposed on a barrel of a container along a vertical direction; and an upper engaging portion and a lower engaging portion provided to protrude laterally from sites near vertically opposite ends of the handle body, and having leading ends engaged with the container, wherein the upper engaging portion is provided to protrude in a narrower width than the handle body, projections protruding outwardly from opposite side end surfaces of the leading end of the upper protruding portion are provided near the leading end of the upper protruding portion, and grooves are defined on opposite side surfaces of the upper engaging portion by the upper engaging portion, the handle body, and the projections.

Effects of the Invention

According to the present invention described above, the second transport jig supports the opposite side surfaces of the container handle supplied from the supply section. Thus, the container handle can be held by the second transport jig relatively easily. For example, even while the first transport jigs holding the preforms are being continuously transported, the container handles can be supplied satisfactorily to the second transport jigs arranged between such first transport jigs, and can be held thereby in a satisfactory manner. By so doing, the manufacturing efficiency is increased, and the yield is increased, so that the costs can be cut down.

DETAILED DESCRIPTION OF PREFERRED EMBODIMENT(S)

An embodiment of the present invention will now be described in detail with reference to the accompanying drawings.

First of all, an explanation will be presented for an example of a handle-equipped container provided with a container handle according to the present invention.

Figure 1:
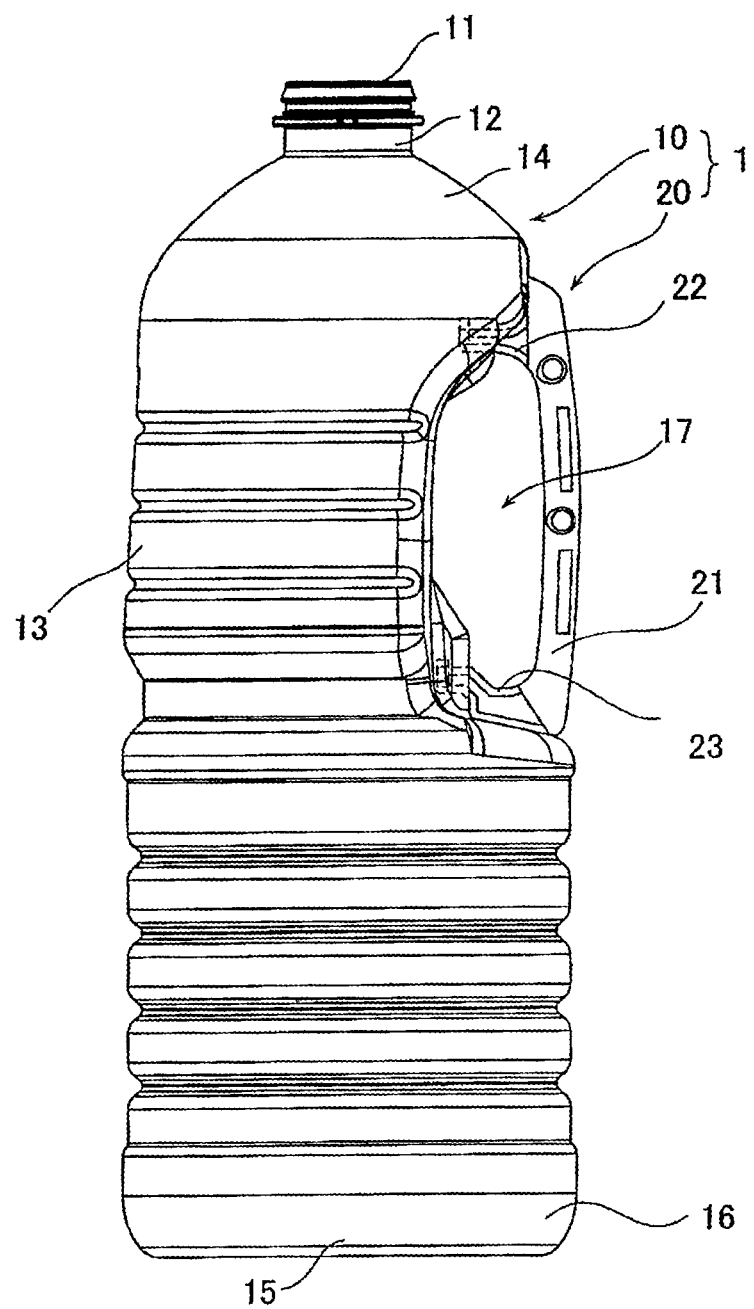
FIG. 1 is a side view of a handle-equipped container having a container handle according to an embodiment of the present invention.

As shown in FIG. 1, a handle-equipped container 1 according to the present embodiment is a container to be filled with contents (liquid) such as water, and has a container body 10 and a container handle 20. The container body 10 is formed of a polyethylene terephthalate (PET) resin, and is composed of a neck 12 having an opening 11 at its upper end, a cylindrical barrel 13, a shoulder 14 connecting the neck 12 and the barrel 13 and expanding gradually from the side of the neck 12, a bottom 15 sealing an end of the barrel 13, and a heel 16 connecting the barrel 13 and the bottom 15. In an upper half of the barrel 13, a concavity 17 for a handle is formed. In the concavity 17, the container handle 20 is disposed and attached to the container body 10.

Figure 2:
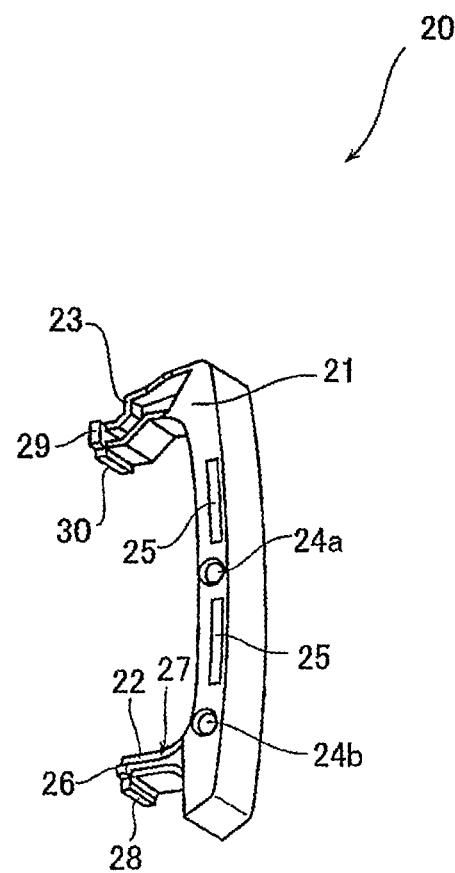
FIG. 2 is a perspective view showing the container handle according to the embodiment of the present invention in an inverted state.

In the container handle 20, as shown in FIGS. 1 and 2, a handle body 21 disposed along the vertical direction of the concavity 17, and an upper engaging portion 22 and a lower engaging portion 23 protruding laterally from sites near the vertically opposite ends of the handle body 21 are provided in the concavity 17 of the container body 10, so that the container handle 20 is in a nearly U-shaped configuration as a whole. It is to be noted that FIG. 2 is a view showing the container handle 20 in an inverted state. In this drawing, therefore, the upper engaging portion 22 is located on the lower end side of the handle body 21, while the lower engaging portion 23 is located on the upper end side of the handle body 21.

The handle body 21 is a part to be manually gripped, and is disposed on the barrel 13 of the container body 10 along the vertical direction thereof. At the side surface of the handle body 21, positioning holes 24a, 24b are formed nearly in the middle in the vertical direction, and near the base end of the upper engaging portion 22. Concavities 25 for suction are formed on both sides of the positioning hole 24a in the middle. These positioning holes 24a, 24b and concavities 25 are utilized in manufacturing the handle-equipped container 1, and detailed descriptions will be presented later in this connection.

The upper engaging portion 22 and the lower engaging portion 23 are provided to protrude laterally from the neighborhood of the vertically opposite ends of the handle body 21, as mentioned above. That is, the upper engaging portion 22 and the lower engaging portion 23 are provided to protrude nearly perpendicularly to the handle body 21. The upper engaging portion 22 is provided to protrude in a narrower width than the handle body 21 and, near its leading end, is provided with first projections 26 protruding from its opposite side end surfaces outwardly in the width direction. Thus, at the opposite side surfaces of the upper engaging portion 22, grooves 27 are defined by the upper engaging portion 22, the handle body 21, and the first projections 26. At the leading end position of the upper engaging portion 22, moreover, there is formed a second projection 28 crooked upward (toward the opening 11 of the container body 10). On the other hand, the lower engaging portion 23 is provided to protrude in a width comparable to the width of the handle body 21 and, near its leading end, is provided with first projections 29 protruding from its opposite side end surfaces outwardly in the width direction, similarly to the upper engaging portion 22. At the leading end position of the lower engaging portion 23, moreover, there is formed a second projection 30 crooked upward (toward the opening 11 of the container body 10).

Such a container handle 20 is integrated with the container body 10 by a resin wrapping around the first projections 26, 29 and the second projections 28, 30 during formation of the container body 10 by blow molding, whereby the handle-equipped container 1 is formed (see FIG. 1).

A forming apparatus for forming such a handle-equipped container 1 will be described below by reference to FIG. 3 to FIGS. 10(a), 10(b).

Figure 3:
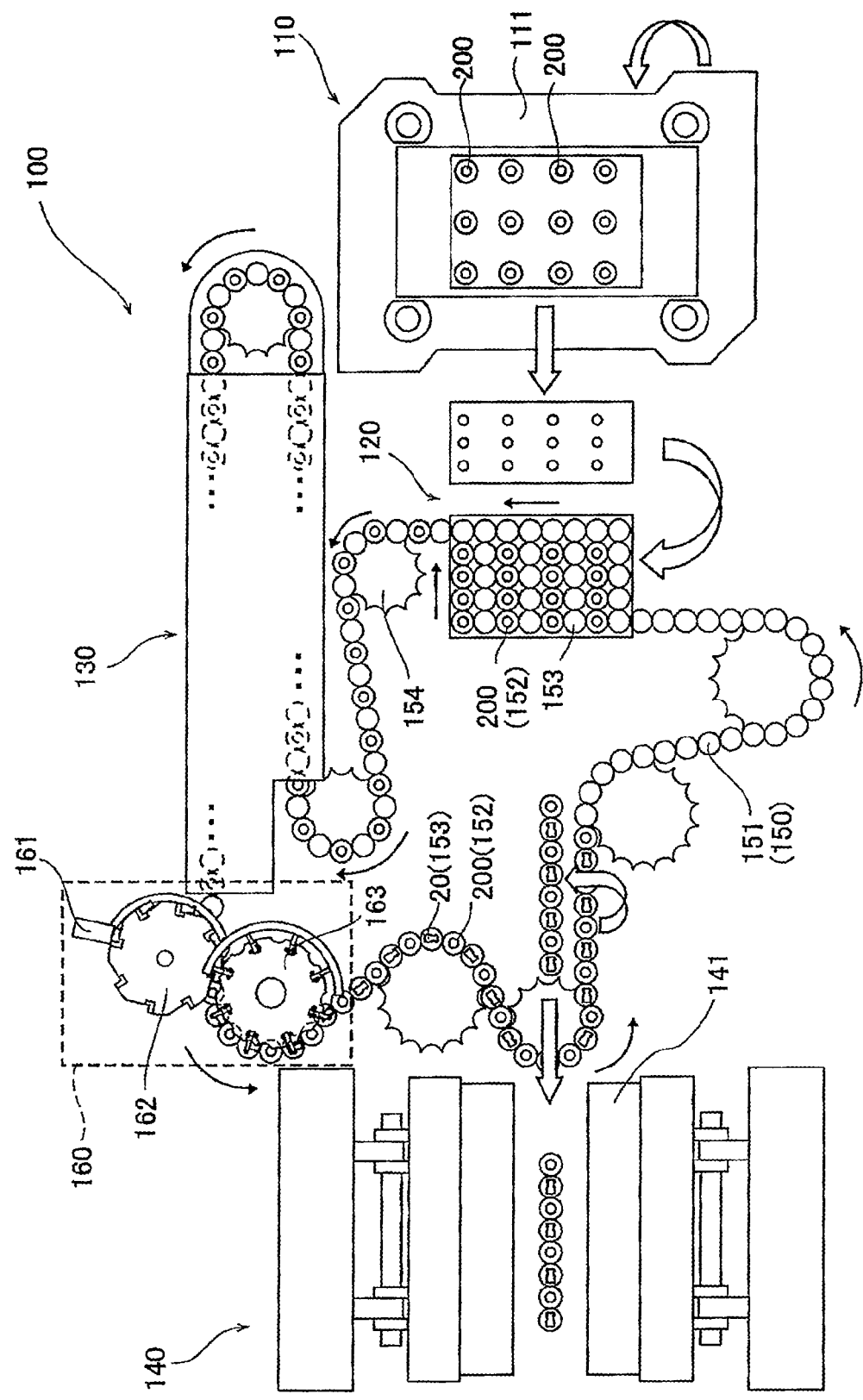
FIG. 3 is a plan view showing the entire configuration of a forming apparatus according to the embodiment of the present invention.

As shown in FIG. 3, an apparatus 100 for forming a handle-equipped container according to the present embodiment is equipped with an injection molding section 110 for injection molding preforms 200 (see FIG. 4), which will become the above-described container bodies 10; a cooling section 120 for cooling the preforms 200 molded in the injection molding section 110; a heating section 130 for heating the preforms 200; and a blow molding section 140 for blow molding the preforms 200 arranged within blow cavity molds.

The forming apparatus 100 is also equipped with a transport section 150 including a loop-shaped transport line 151 circulating from the cooling section 120 through the heating section 130 and the blow molding section 140. Furthermore, a supply section 160 for supplying the container handles 20 to the transport section 150 is provided halfway through the transport line 151, for example, downstream of the heating section 130. The transport section 150 transports the preform 200 from the cooling section 120 to the heating section 130, and also transports the preform 200, which has been heated in the heating section 130, and the container handle 20, which has been supplied from the supply section 160, to the blow molding section 140.

The forming apparatus 100 according to the present invention is characterized by the transport section 150 and the supply section 160, and the configurations of these sections will be described in detail below. Since the configurations of the injection molding section 110, the cooling section 120, the heating section 130, and the blow molding section 140 are publicly known, they will be explained here briefly. (If necessary, reference is requested to WO2013/027692, the international publication by the present applicant.)

The injection molding section 110 is equipped with a mold clamping mechanism 111, and clamps a core mold disposed above and a cavity mold disposed below by the mold clamping mechanism 111, although their illustrations are omitted. In the injection molding section 110, an injection space defined by the core mold and the cavity mold is charged with a resin material (raw material) by an injection device, whereby the preform 200 is injection molded.

In the injection molding section 110, assume, for example, that up to 24 (3 rows×8/row) of the preforms can be molded simultaneously. The forming apparatus 100 according to the present embodiment forms the handle-equipped containers 1. As will be described later, the container handles 20 are supplied between the preforms 200 in the transport line 151. In this case, therefore, the maximum number of the preforms simultaneously molded is 12 (3 rows×4/row).

The cooling section 120 forcibly cools the injection molded preforms 200. The preforms 200 injection molded in the injection molding section 110 are transported from the injection molding section 110 to the cooling section 120 by a transport device (not shown), and forcedly cooled in the cooling section 120. The preforms 200 cooled to a predetermined temperature in the cooling section 120 are carried out into the transport line 151 constituting the transport section 150, and transported continuously.

The preforms 200 are molded in an upright state with the neck facing upward in the injection molding section 110 and, in this state, are transported from the injection molding section 110 to the cooling section 120. The cooling section 120 has an inversion mechanism (not shown) for inverting the preforms 200, which have been transported in such an upright state, to bring them into an inverted state with the neck facing downward. During cooling in the cooling section 120, the preforms 200 are inverted by the inversion mechanism to enter an inverted state, and held by first transport jigs 152 provided in the transport section 150.

Figure 4:
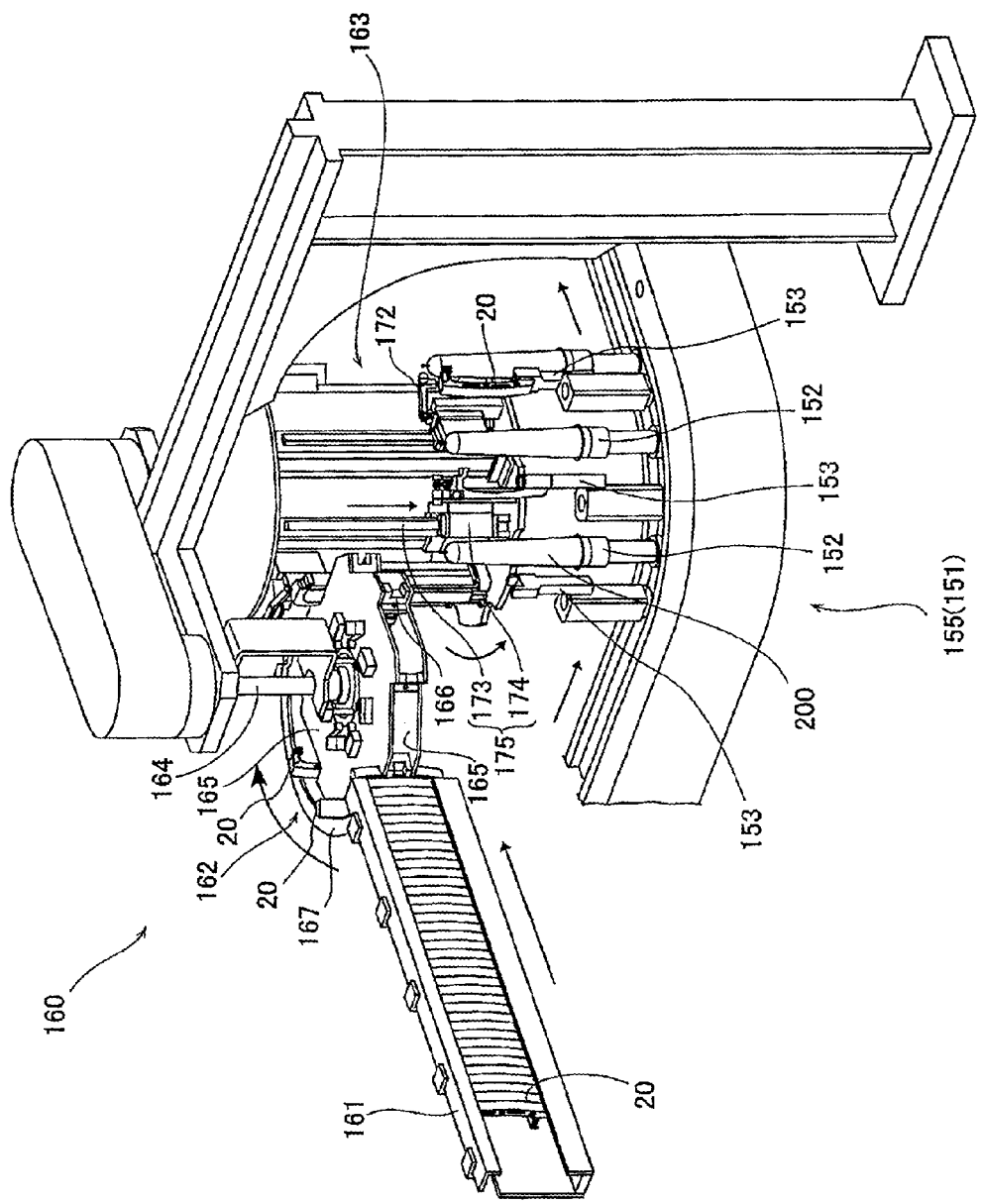
FIG. 4 is a perspective view showing the configuration of a supply section according to the embodiment of the present invention.

The transport section 150 is equipped with the first transport jigs 152 for holding the preforms 200, and second transport jigs 153 for holding the container handles 20 (see FIGS. 3, 4). The transport line 151 is constituted such that the first transport jigs 152 and the second transport jigs 153 are transported continuously and sequentially by the driving force of a sprocket 154 or the like.

Below the cooling section 120, the first transport jigs 152 and the second transport jigs 153 are arranged in a plurality of rows. The first transport jigs 152 holding the preforms 200, and the second transport jigs 153, which are empty without holding the container handles 20, are alternately carried out into the transport line 151. Then, the preforms 200 held by the first transport jigs 152 are transported along the transport line 151 and carried into the heating section 130.

In the heating section 130, the preforms 200 cooled in the cooling section 120 are heated to a temperature suitable for stretching while being moved along the transport line 151. In the present embodiment, the preforms 200 are heated, while being allowed to rotate on their own axes, within the heating section 130, whereby the preforms 200 are each heated uniformly as a whole.

After the preforms 200 are heated by the heating section 130 in the above manner, the container handle 20 is supplied between the preforms 200 by the supply section 160. In the transport line 151, a curved transport portion 155 (see FIG. 4) curved with a predetermined radius is provided downstream of the heating section 130, and the supply section 160 is provided in correspondence with the curved transport portion 155. As stated earlier, the transport section 150 has the first transport jigs 152 for holding the preforms 200, and the second transport jigs 153 for holding the container handles 20 and, in the transport line 151, the first transport jigs 152 and the second transport jigs 153 are transported alternately. The supply section 160 sequentially supplies the container handles 20 to the second transport jigs 153 transported in a manner alternating with the first transport jigs 152.

Figure 5:
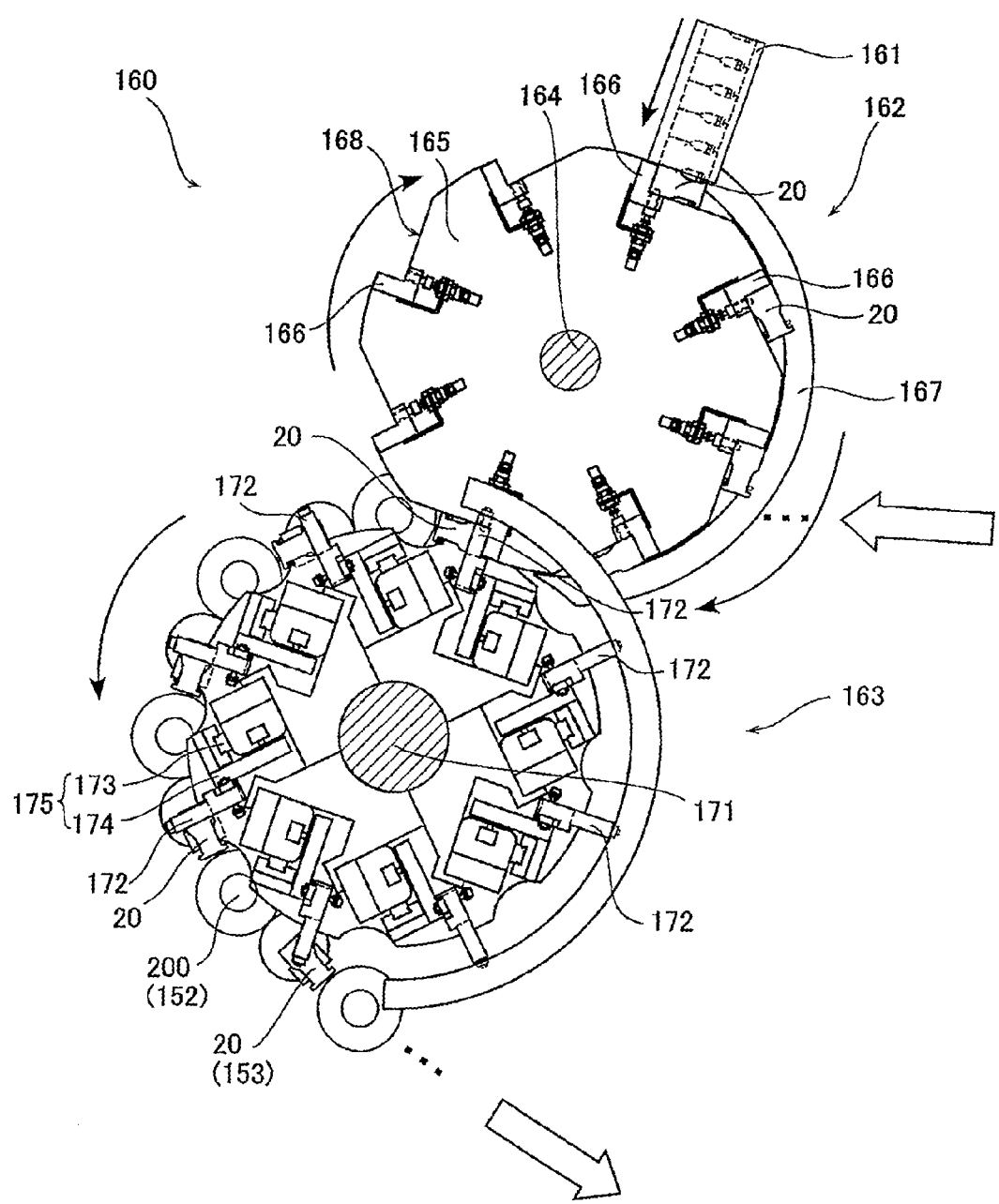
FIG. 5 is a plan view showing the configuration of the supply section according to the embodiment of the present invention.
Figure 6:
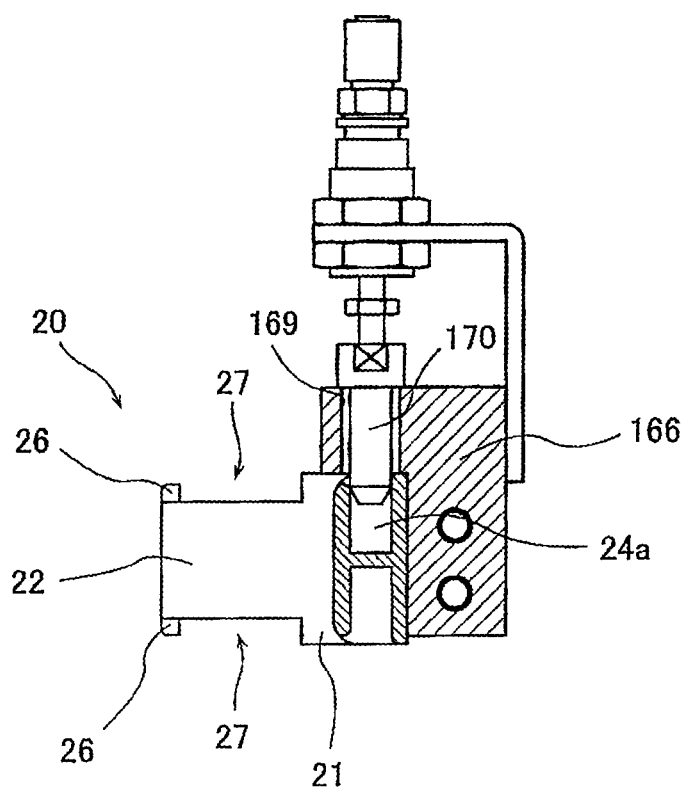
FIG. 6 is a sectional view of essential parts showing a first holding member according to the embodiment of the present invention.
Figure 7:
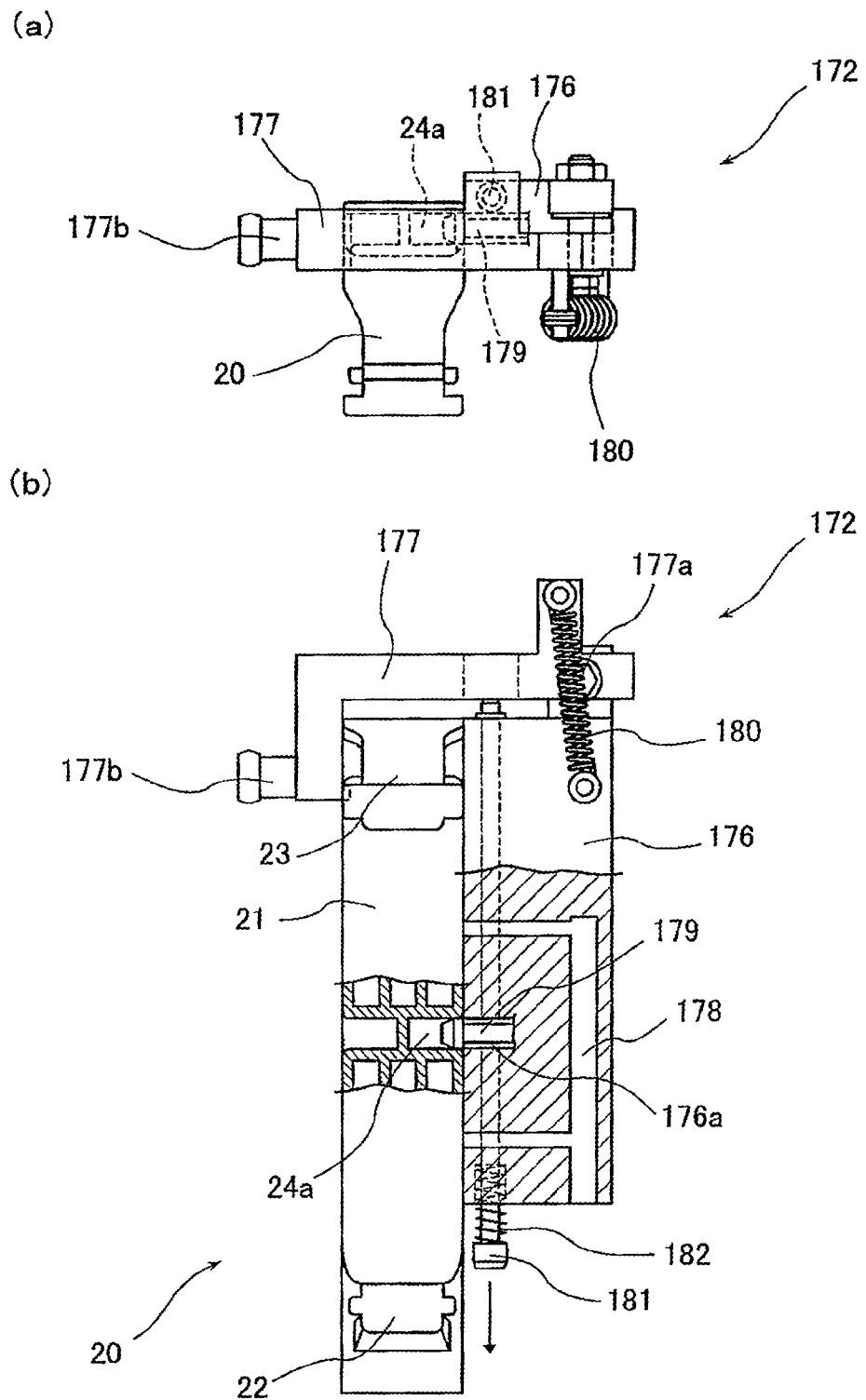
FIGS. 7(a), 7(b) are a plan view and a front view of a second holding member according to the embodiment of the present invention.

As shown in FIGS. 4 and 5, the supply section 160 is disposed above the curved transport portion 155, and lowers the container handle 20 while rotating it in synchronism with the rotation of the second transport jig 153 in the curved transport portion 155, thereby continuously supplying the container handle 20 to the second transport jig 153. In the present embodiment, the supply section 160 is composed of a cartridge 161 holding a plurality of the container handles 20, and a first holding/transport mechanism 162 and a second holding/transport mechanism 163, both designed to hold and transport the container handles 20. The first holding/transport mechanism 162 holds the container handles 20 sequentially supplied from the cartridge 161, and transports them to the second holding/transport mechanism 163. The second holding/transport mechanism 163 receives the container handles 20 from the first holding/transport mechanism 162, and transports them to the second transport jigs 153.

The first holding/transport mechanism 162 holds the container handles 20 supplied from the cartridge 161, and transports them continuously, while rotating in a direction opposite to the transport direction of the second transport jig 153. In the present embodiment, the first holding/transport mechanism 162 has a pair of disk-shaped members 165 supported by a shaft member 164, and a predetermined number of (for example, 8) first holding members 166 arranged on the peripheries of the disk-shaped members 165 for holding the container handles 20 supplied from the cartridge 161. Outwardly of the disk-shaped members 165, there is provided a guide member 167 for guiding the movement of the container handles 20 held by the holding members 166. The shaft member 164 is configured to be rotated by a driving means such as a motor (not shown).

In the disk-shaped member 165, cutouts 168 are formed at positions where the container handles 20 are supplied. The first holding members 166 are provided in correspondence with the corners of these cutouts 168, and fixed between the pair of disk-shaped members 165. Each of the first holding members 166 is formed in a nearly L-shaped configuration so that the container handle 20 contacts two surfaces thereof. In the first holding member 166, a through-hole 169 is formed at a position corresponding to the positioning hole 24a of the container handle 20, and a positioning pin 170 is inserted through the through-hole 169.

When the container handle 20 is supplied from the cartridge 161 to the first holding member 166, the positioning pin 170 is pushed out by a driving means such as an air cylinder, and inserted into the positioning hole 24a of the container handle 20. By this measure, the container handle 20 is positioned at a predetermined position, and held by the first holding member 166. Since the disk-shaped member 165 is rotating at this time, the container handle 20 is held by the first holding member 166 and, at nearly the same time, also supported by the guide member 167 (see FIG. 5). Thus, the container handle 20 is transported while being sandwiched between the holding member 166 and the guide member 167. The container handle 20 held and transported in this manner by the first holding/transport mechanism 162 is released from the guide member 167, and passed on to the second holding/transport mechanism 163, when the disk-shaped member 165 has rotated through nearly a half turn.

While rotating in the same direction as the transport direction of the second transport jig 153, the second holding/transport mechanism 163 sequentially receives the container handles 20 supplied from the first holding/transport mechanism 162, and transports them to the second transport jigs 153. The second holding/transport mechanism 163 is configured to be rotatable about a shaft member 171. The second holding/transport mechanism 163 is configured to rotate in synchronism with the rotation (movement) of the second transport jigs 153 and also rotate in synchronism with the rotation of the first holding/transport mechanism 162.

Around the shaft member 171, a predetermined number of (for example, 8) second holding members 172 for holding the container handles 20 are provided to be vertically slidable. For example, around the shaft member 171, slide mechanisms 175, each of which has a slide shaft 173 extending in a vertical direction, and a slide member 174 engaging the slide shaft 173 and sliding in the vertical direction, are provided in correspondence with the second holding members 172. The second holding members 172 are fixed to the slide members 174 and slidable vertically.

As shown in FIGS. 7(a), 7(b), the second holding member 172 has a holding member body 176, and a locking portion 177 swingably coupled to an upper part of the holding member body 176 for locking an upper part of the inverted container handle 20 (i.e., on the side of the lower engaging portion 23). In the holding member body 176, there is provided a suction hole 178 opening at a surface which the handle body 21 of the container handle 20 contacts. The suction hole 178 opens at the position opposing the concavities 25 (see FIG. 2) formed in the handle body 21, and is connected to a suction device (not shown). The holding member body 176 also has a positioning pin 179 at a position corresponding to the positioning hole 24a of the container handle 20. The positioning pin 179 is provided within a hole portion 176a formed in the holding member body 176, and is movable within the hole portion 176a, for example, by a drive mechanism (not shown). In the present embodiment, the positioning pin 179 is held in a state retracted into the hole portion 176a when the second holding member 172 does not hold the container handle 20, whereas the positioning pin 179 is pushed out and inserted into the positioning hole 24a of the container handle 20 when the second holding member 172 holds the container handle 20. As a result, the container handle 20 is positioned at a predetermined position of the second holding member 172.

The locking portion 177 has a support part 177a on one end side thereof supported swingably by the holding member body 176. The leading end side (the other end side) of the locking portion 177 is pushed downward, with the support part 177a as a fulcrum, whereby the locking portion 177 is engaged with the container handle 20 (a closed state).

A spring member 180 is fixed to the locking portion 177 and is also fixed to the holding member body 176. The sites of its fixing to the locking portion 177 and to the holding member body 176 are not located vertically to each other, and the spring member 180 is swingable, with its site of fixing to the holding member body 176 as a fulcrum, in accordance with the motion of the locking portion 177.

In the closed state shown in FIGS. 7(a), 7(b), therefore, the leading end side of the locking portion 177 relative to the support part 177a is urged downward by the spring member 180, and the state of engagement of the locking portion 177 with the container handle 20 (i.e., the closed state) is maintained by this urging force. The push-down motion of the locking portion 177 is made, for example, by allowing a cam follower 177b, which protrudes from the leading end of the locking portion 177, to roll on a cam member (not shown) disposed on the second holding/transport mechanism 163.

In the holding member body 176, a through-hole penetrating the holding member body 176 in the vertical direction is formed, and a rod-shaped pressing member 181 is provided slidably within the through-hole. The pressing member 181 is kept urged downward by a spring member 182 consisting of a coil spring or the like. When the pressing member 181 is pushed upward against the urging force of the spring member 182, the locking portion 177 is released from engagement with the container handle 20 (an open state).

Figure 8:
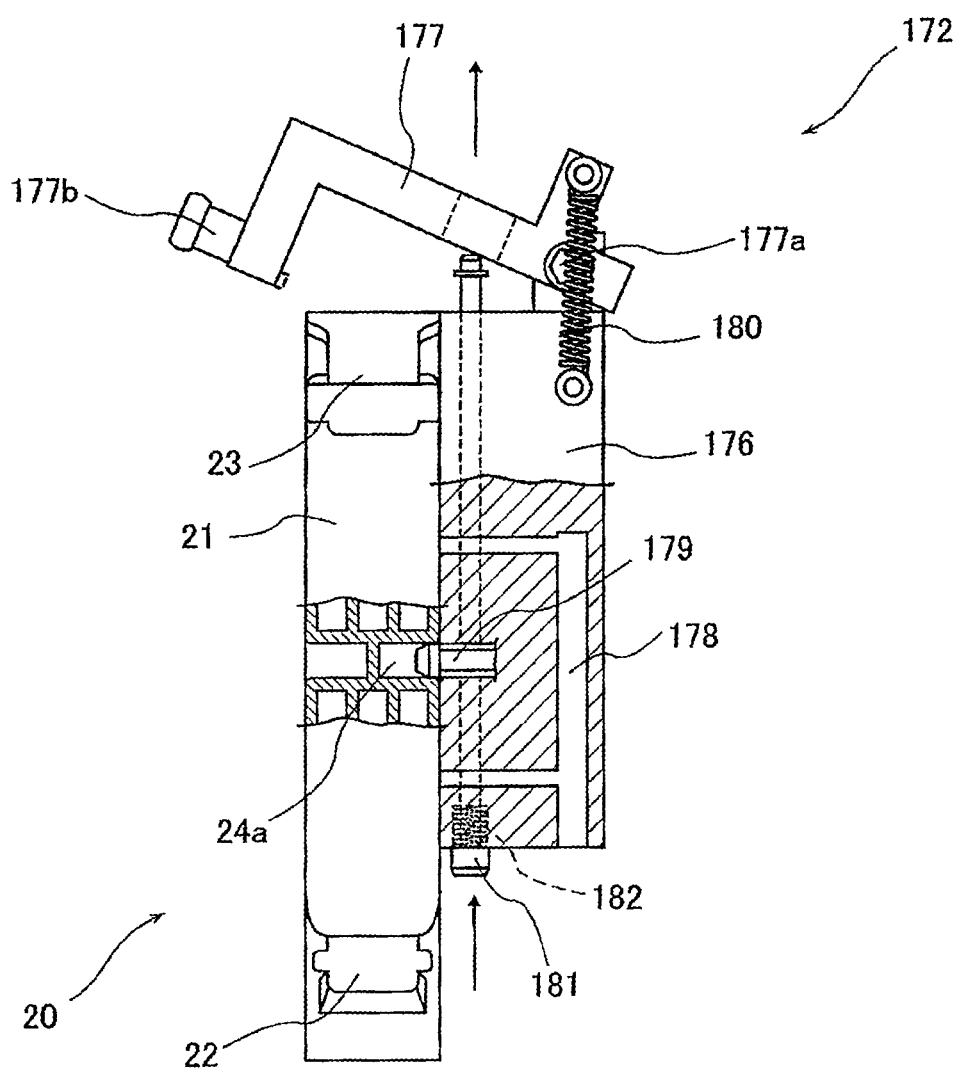
FIG. 8 is a front view of the second holding member according to the embodiment of the present invention.

In the open state in FIG. 8, the one end side (the right-hand side in the drawing) of the locking portion 177 relative to the support part 177a is urged downward, with the result that the leading end side of the locking portion 177 relative to the support part 177a is urged upward. At this position, therefore, the locking portion 177 is maintained in the open state by the urging force of the spring member 180.

With the above-described second holding/transport mechanism 163, the second holding member 172, when located at the upper end of the slide shaft 173 (see FIG. 5), receives the container handle 20 supplied from the first holding member 166 of the first holding/transport mechanism 162. That is, the container handle 20 is positioned upon insertion of the positioning pin 179 into the positioning hole 24a. In this state, each concavity 25 is sucked, and the locking portion 177 is engaged, whereby the container handle 20 is held by the second holding member 172. It is to be noted that if a sufficient holding force can be achieved merely by the positioning pin 179 and the locking portion 177, no suction is required.

The second holding member 172 holding the container handle 20 descends while rotating in synchronization with the rotation of the second transport jig and, at a predetermined position, delivers the container handle 20 to the second transport jig 153. For example, when the second holding member 172 lowers to the lower end of the slide shaft 173, the pressing member 181 is pushed upward, as shown in FIG. 8. In accordance with this motion, the locking portion 177 is pushed upward. That is, the engagement of the locking portion 177 with the container handle 20 is released. On this occasion, the suction by the suction device is stopped, whereupon the container handle 20 is delivered from the second holding member 172 to the second transport jig 153.

Figure 9:
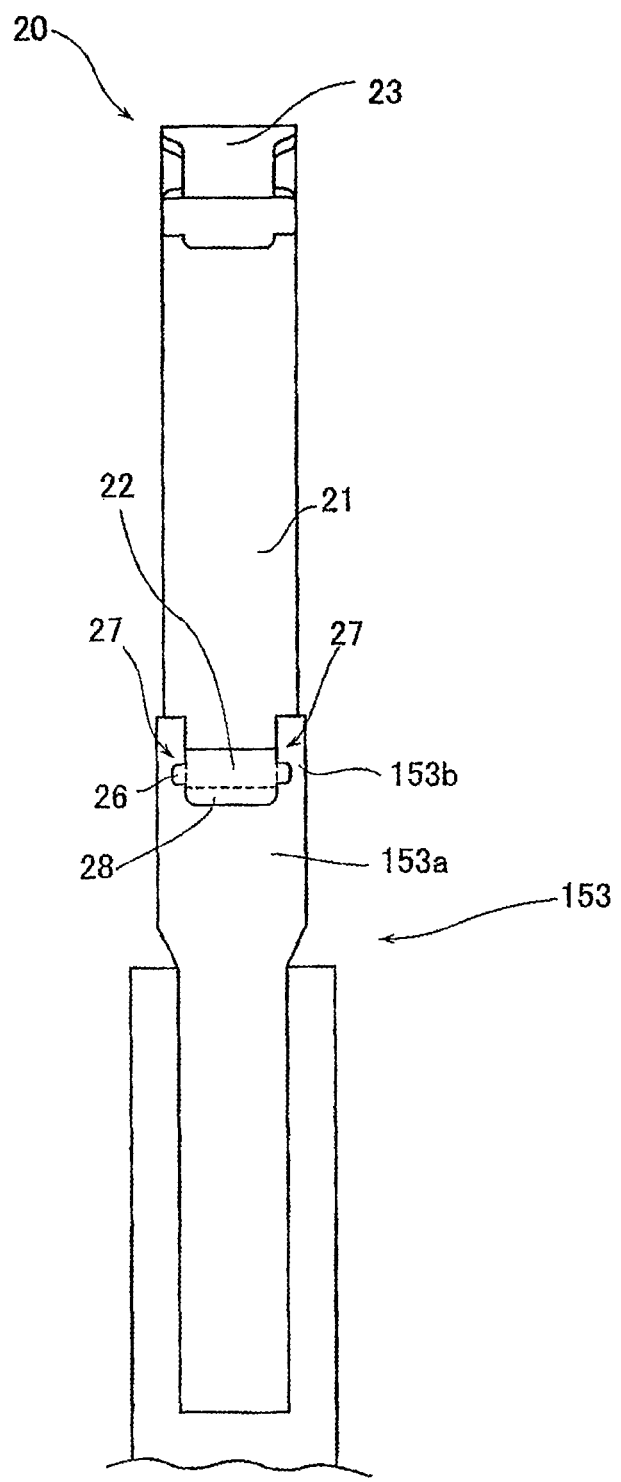
FIG. 9 is a front view of a second transport jig according to the embodiment of the present invention.
Figure 10:
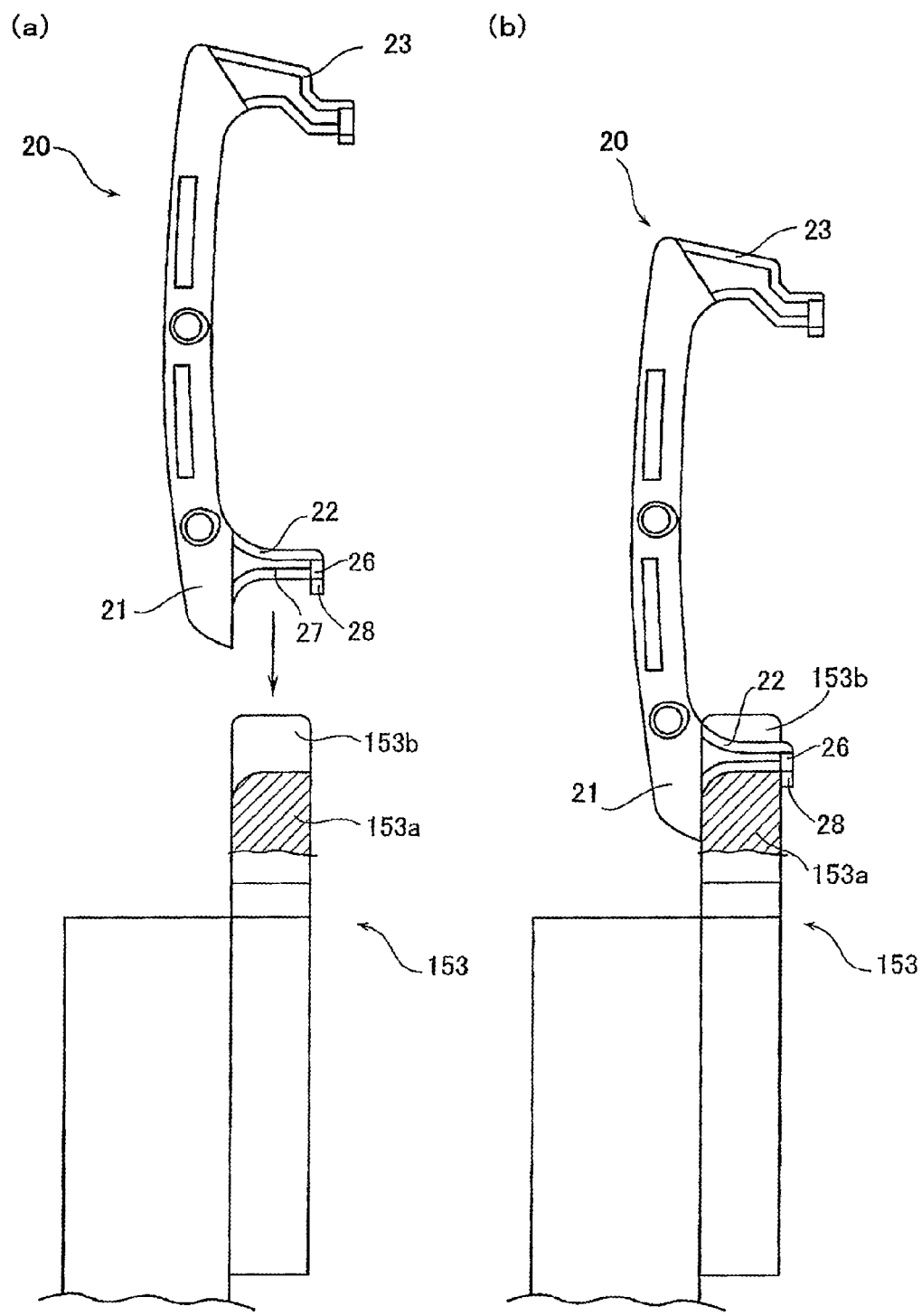
FIGS. 10(a), 10(b) are sectional views of essential parts showing the actions of the second transport jig according to the embodiment of the present invention.

The second transport jig 153 according to the present invention is configured to hold the container handle 20 by supporting a pair of opposite side surfaces of the container handle 20. Concretely, as shown in FIGS. 9 and 10 (a), 10 (b), the second transport jig 153 has a pair of engaging portions 153b provided so as to protrude upward from the opposite sides of a jig body 153a. When the container handle 20 is supplied from above between the pair of engaging portions 153b, the respective engaging portions 153b engage both side surfaces of the container handle 20, whereby the container handle 20 is held by the second transport jig 153. In the container handle 20, as described earlier, the grooves 27 are defined in the opposite side surfaces of the upper engaging portion 22 by the upper engaging portion 22, the handle body 21, and the first projections 26. The engaging portions 153b of the second transport jig 153 are inserted into the grooves 27, whereby the container handle 20 is held by the second transport jig 153. Furthermore, the handle body 21, and the second projection 28 provided at the leading end of the upper engaging portion 22 contact the jig body 153a, thereby regulating the movement of the container handle 20 (see FIG. 10(b)).

After the container handle 20 is held by the second transport jig 153 in this manner, the first transport jig holding the preform and the second transport jig holding the container handle are transported along the transport line, and carried into the blow molding section 140.

In the blow molding section 140, the preforms 200 and the container handles 20, held in an inverted state, are inverted and taken out in an upright state (see FIG. 3), by predetermined numbers (for example, 4 of the preforms and 4 of the container handles) at a time, by transfer arms (not shown). The predetermined numbers of the preforms 200 and the container handles taken out are transported to blow cavity molds 141 each composed of a pair of split molds. In the blow cavity mold 141, the preform 200 is blow molded to form the handle-equipped container 1 (see FIG. 1).

With the forming apparatus 100 according to the present invention, as described above, the second transport jig 153 of the foregoing configuration is adopted. Thus, the container handle 20 supplied by the supply section 160 can be held by the second transport jig 153 relatively easily and reliably. Compared with the conventional configuration in which the container handle is held by the pin, for example, the configuration of the second transport jig 153 according to the present invention enables the supply section 160 to supply the container handle 20 satisfactorily and easily for satisfactory and easy holding. In the present embodiment, moreover, the supply section 160 rotates the container handle 20 in synchronization with the rotation of the second transport jig 153, thus making it possible to deliver the container handle 20 to the second transport jig 153 more reliably. For example, even while the first transport jigs 152 holding the preforms 200 are being transported continuously, the second transport jigs 153 arranged therebetween can be satisfactorily supplied with the container handles and allowed to hold them.

Besides, the container handle 20 according to the present invention is provided with the inwardly recessed grooves 27 in both side surfaces of the upper engaging portion 22. By inserting the engaging portions 153b of the second transport jig 153 into the grooves 27, the container handle 20 can be held satisfactorily by the second transport jig 153 in a highly accurately positioned state.

According to the present invention, therefore, the manufacturing efficiency of the handle-equipped container can be increased, its yield can be increased, and its costs can be cut down.

The embodiment of the present invention has been described as above. However, the present invention is in no way limited to the foregoing embodiment, and changes and modifications can be made, as appropriate, without departing from the spirit and scope of the invention.

The above embodiment, for example, illustrates the configuration of the first holding/transport mechanism. 162 which is equipped with the first holding members 166 each provided with the positioning pin 170, and in which the container handle 20 is positioned at the predetermined position by the positioning pin 170 and held by the first holding member 166. However, the first holding/transport mechanism 162 is not limited to this configuration. For example, the first holding member 166 is not limited, if it can hold the container handle 20.

Figure 11:
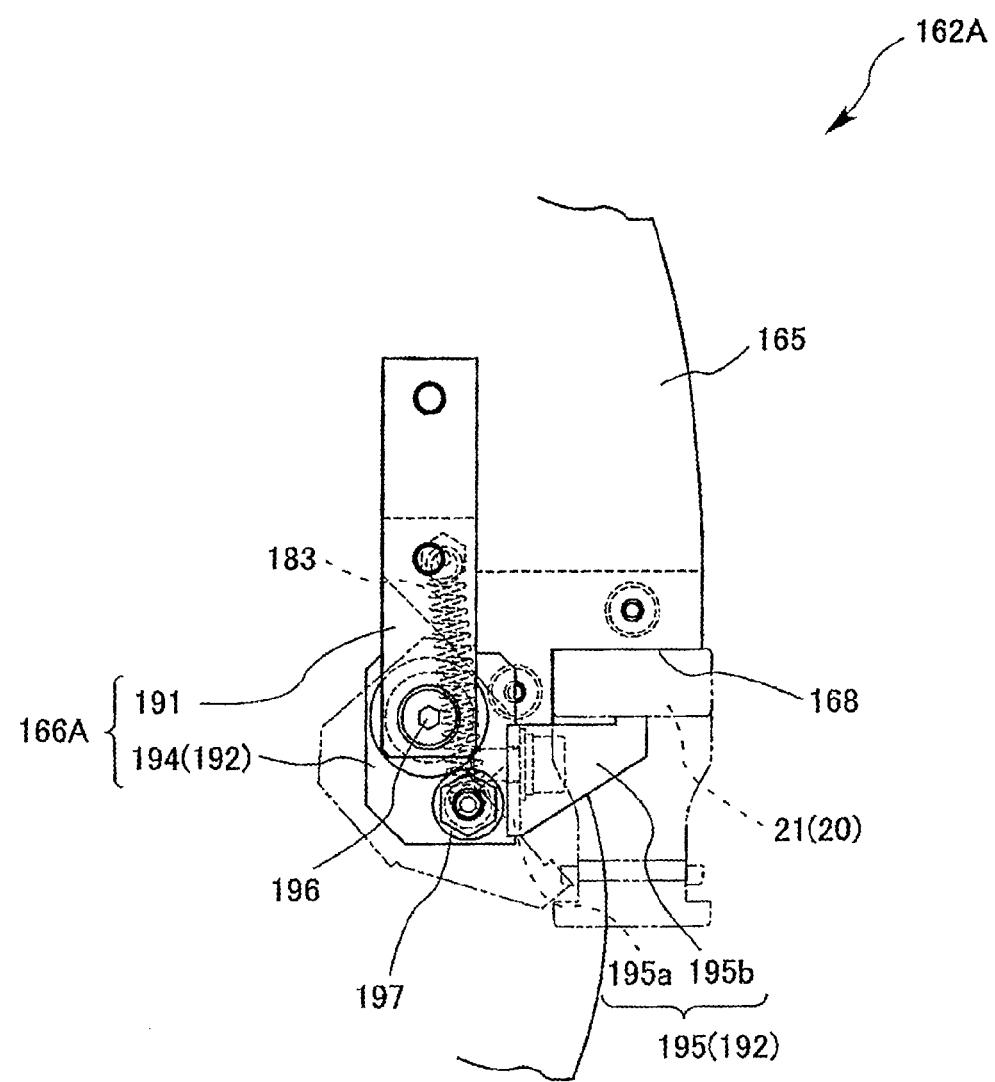
FIG. 11 is a plan view showing essential parts of a first holding/transport mechanism according to the embodiment of the present invention.
Figure 12:
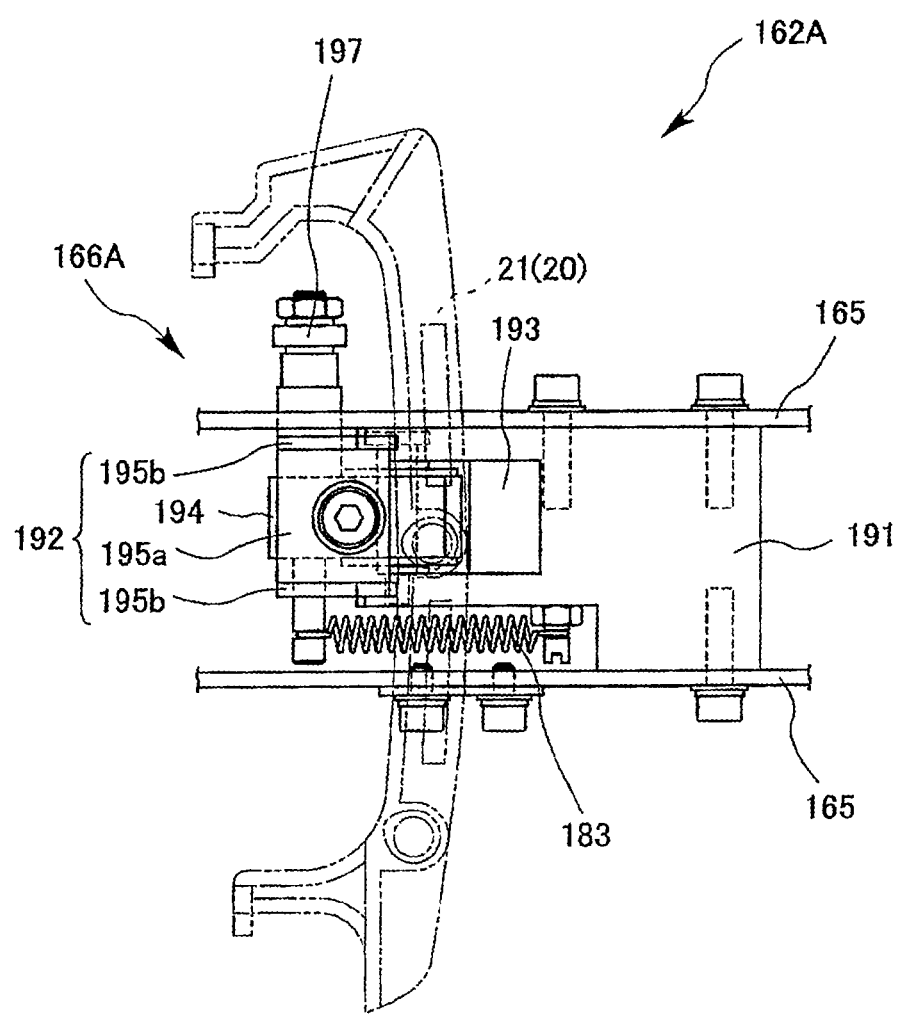
FIG. 12 is a side view showing the essential parts of the first holding/transport mechanism according to the embodiment of the present invention.

FIG. 11 is a plan view showing another example of the first holding member constituting the first holding/transport mechanism, a view showing a state in which the disk-shaped member located at the upper position is excluded. FIG. 12 is a side view of the parts corresponding to the first holding member constituting the first holding/transport mechanism.

As shown in FIGS. 11 and 12, a first holding/transport mechanism 162A is in a configuration in which the container handle 20 is pinched between the disk-shaped member 165 and a first holding member 166A. The first holding member 166A has a holding member body 191 fixed between a pair of the disk-shaped members 165, and a pinching member 192 coupled swingably to the holding member body 191 for pinching the container handle 20 between the pinching member and the disk-shaped members 165.

The holding member body 191 is disposed along a nearly tangential direction with respect to the disk-shaped member 165 so that an end part of the holding member body 191 corresponds to the cutout 168 of the disk-shaped member 165. In the end part of the holding member body 191, an insertion groove 193 into which the pinching member 192 is inserted is formed along the surface of the disk-shaped member 165.

The pinching member 192, in this example, is composed of a coupling member 194 coupled swingably to the holding member body 191, and a locking member 195 fixed to the coupling member 194 for locking the handle body 21 of the container handle 20. The coupling member 194 is supported by a support shaft 196 while being inserted into the insertion groove 193 of the holding member body 191, and is thus swingable relative to the holding member body 191. The locking member 195 is formed, for example, by bending a plate-shaped member comprising a metal or the like into a U-shaped form, and is composed of a fixing portion 195a fixed to the coupling member 194, and a pair of protrusions 195b protruding from the vertically opposite ends of the fixing portion 195a in the radially outward direction of the disk-shaped member 165.

On the upper surface of the coupling member 194, a cam follower 197 is provided to protrude above the disk-shaped member 165. In the disk-shaped member 165, through-holes are formed at positions corresponding to the cam followers 197, although this is not illustrated, and the cam followers 197 are provided to pass through these through-holes and protrude above the disk-shaped member 165. Each of these through-holes is formed in such a size and such a shape as to permit the movement of the cam follower 197 in association with the swing of the pinching member 192.

A spring member 183 fixed to the coupling member 194 on one end side thereof has the other end side fixed to the lower surface of the coupling member 194. The one end side of the spring member 183 is fixed to a side slightly inward of the cam follower 197 (a side opposite to the cutout 168), and the other end side of the spring member 183 is fixed to a position opposing the cam follower 197.

With the first holding/transport mechanism 162A of such a configuration, the cam follower 197 provided on the coupling member 194 makes contact with and rolls on a cam member (not shown) provided on the first holding/transport mechanism 162A in accordance with the rotation of the disk-shaped member 165, whereby the pinching member 192 opens and closes.

It goes without saying that the first holding/transport mechanism 162A, even when configured as above, can satisfactorily hold and transport the container handle 20, like the aforementioned first holding/transport mechanism 162. In the case of such a configuration, the aforementioned guide member 167 (see FIG. 5) need not necessarily be provided.

Furthermore, the structure of the second transport jig 153 is not limited to the one in the aforementioned embodiment, but may be a structure, for example, as will be described below.

Figure 13:
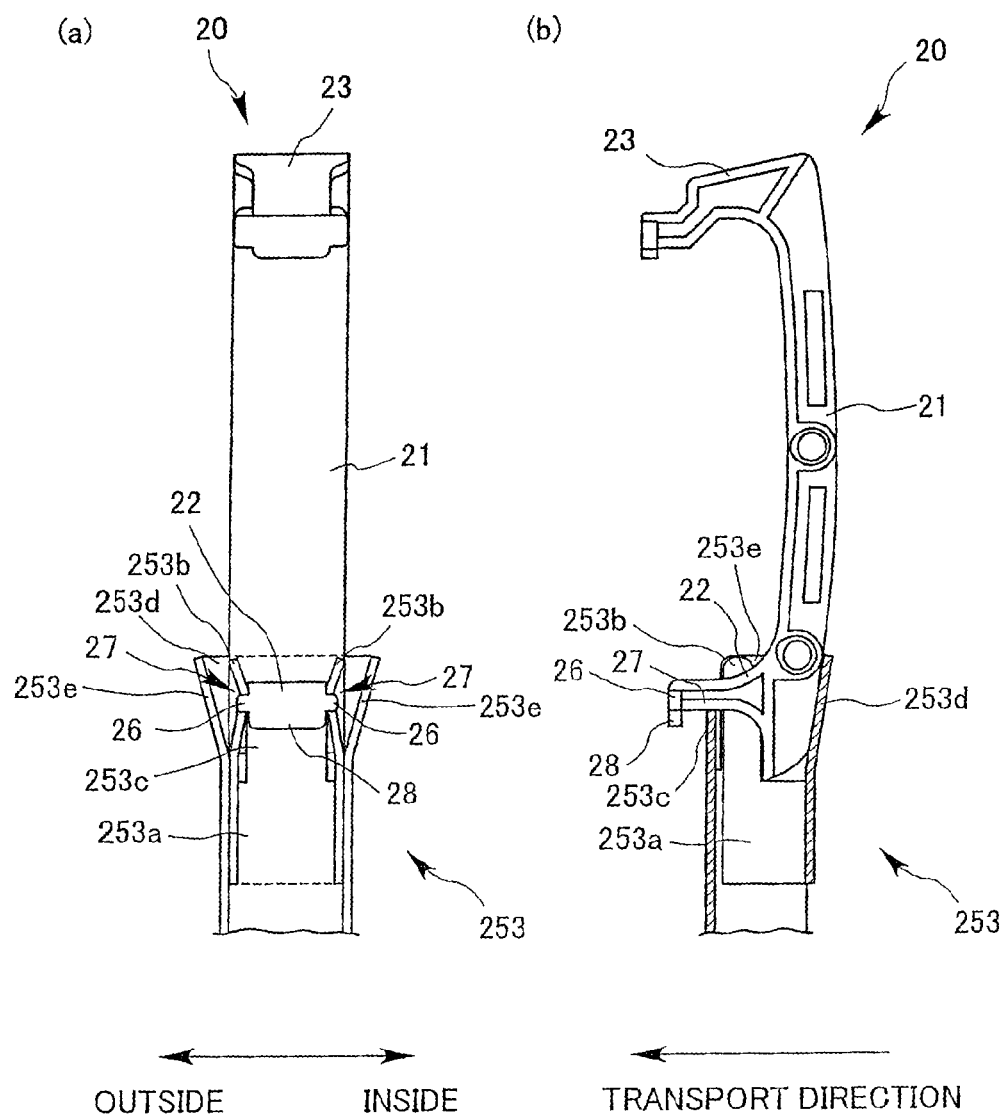
FIGS. 13(a), 13(b) are a front view and a sectional view of the second transport jig according to the embodiment of the present invention.

For example, a second transport jig 253 shown in FIGS. 13(a), 13(b) has a pair of engaging portions 253b protruding upward from both sides of a jig body 253a. As in the aforementioned second transport jig 153, the paired engaging portions 253b engage the grooves 27 of the container handle 20, whereby the container handle 20 is held by the second transport jig 253. In this example, each engaging portion 253b is formed in a nearly dog-legged shape, in which the part corresponding to the groove 27 is bent slightly inwardly, for instance, by bending a plate-shaped member comprising a metal material or the like. That is, the distance (minimum distance) between the engaging portions 253b is slightly shorter than the width of the upper engaging portion 22 corresponding to the distance between the grooves 27 of the container handle 20. When the upper engaging portion 22 is engaged between the engaging portions 253b, therefore, the upper engaging portion 22 is urged by each engaging portion 253b under a predetermined pressure. Hence, the container handle 20 can be held satisfactorily by the second transport jig 253.

In the present embodiment, a support portion 253c is erected in the second transport jig 253 (on a side forward of the engaging portions 253b (on a forward side of the second transport jig 253 in the transport direction). The upper engaging portion 22 of the container handle 20 engaging between the engaging portions 253b is also supported by this support portion 253c.

Figure 14:
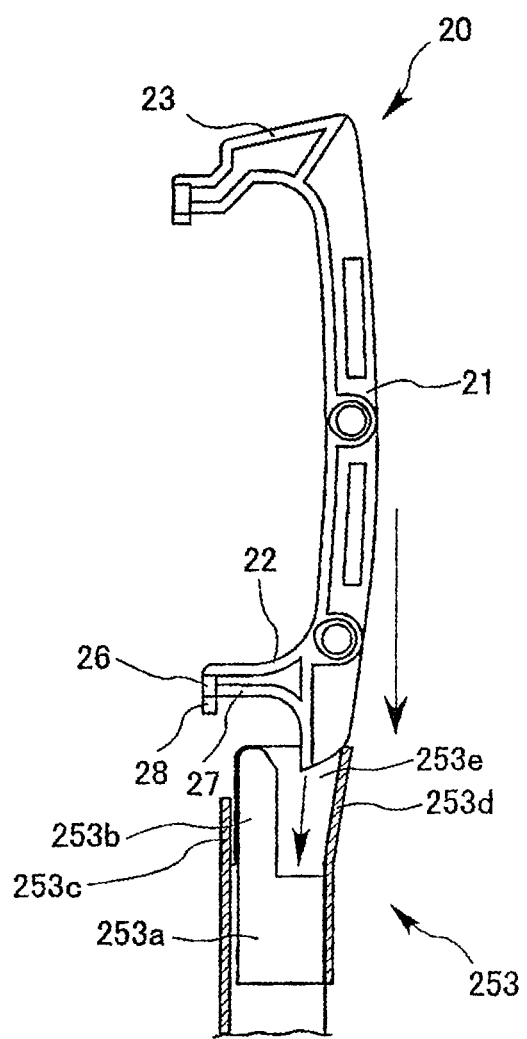
FIG. 14 is a sectional view showing the use state of the second transport jig according to the embodiment of the present invention.

In the second transport jig 253, a guide member 253d is also provided behind the engaging portions 253b (on a rear side of the second transport jig 253 in the transport direction). The guide member 253d is formed along the surface shape of the handle body 21 of the container handle 20 held by the second transport jig 253. When the container handle 20 is to be held by the second transport jig 253, therefore, the container handle 20 contacts the guide member 253d and moves along the guide member 253d, as shown in FIG. 14, even if a slight deviation occurs in the relative position between the container handle 20 and the second transport jig 253. That is, the container handle 20 can be appropriately guided to a predetermined position of the second transport jig 253. Thus, the container handle 20 can be held by the second transport jig 253 more satisfactorily.

In the second transport jig 253, moreover, guide members 253e are provided on both sides of the container handle 20. By providing these guide members 253e, the container handle 20 can be appropriately guided to the predetermined position of the second transport jig 253 in the same manner as does the guide member 253d provided rearwards.

Also, the above embodiment, for example, illustrates the configuration of the apparatus for forming the handle-equipped container which is equipped with the injection molding section for injection molding the preform, together with the blow molding section. However, the present invention, needless to say, can also be applied to an apparatus for forming a handle-equipped container equipped only with a blow molding section while separating an injection molding section.

The above embodiment also illustrates the configuration having the supply section 160 provided downstream of the heating section 130. However, the arrangement of the supply section 160 is not limited to such an arrangement, but the supply section may be arranged before carriage into the blow molding section 140.

EXPLANATIONS OF LETTERS OR NUMERALS

1 Container
10 Container body
11 Opening
12 Neck
13 Barrel
14 Shoulder
15 Bottom
16 Heel
17 Concavity
20 Container handle
21 Handle body
22 Upper engaging portion
23 Lower engaging portion
24 Positioning hole
25 Concavity
26, 29 First projection
27 Groove
28, 30 Second projection
100 Forming apparatus
110 Injection molding section
111 Mechanism
120 Cooling section
130 Heating section
140 Blow molding section
141 Blow cavity mold
150 Transport section
151 Transport line
152 First transport jig
153 Second transport jig
153a Jig body
153b Engaging portion
154 Sprocket
155 Curved transport portion
160 Supply section
161 Cartridge
162 First holding/transport mechanism
163 Second holding/transport mechanism
164 Shaft member
165 Disk-shaped member
166 First holding member
167 Guide member
168 Cutout
169 Through-hole
170 Positioning pin
171 Shaft member
172 Second holding member
173 Slide shaft
174 Slide member
175 Slide mechanism
176 Holding member body
176a Hole portion
177 Engaging portion
177a Support part
177b Cam follower
178 Suction hole
179 Positioning pin
180, 182 Spring member
181 Pressing member
200 Preform

The invention claimed is:

1. An apparatus for forming a handle-equipped container, comprising:
a blow molding section for blow molding a preform, with the preform and a container handle being arranged within a blow cavity, to form a handle-equipped container;
a transport section provided with a transport line, the transport line alternately transporting a first transport jig holding the preform, and a second transport jig holding the container handle, the transport section transporting the preform and the container handle to the blow molding section along the transport line; and
a supply section for lowering the container handle, held in an inverted state, and supplying the container handle to the second transport jig,
the second transport jig supporting at least a pair of opposite side surfaces of the container handle to hold the container handle,
wherein the second transport jig includes a pair of engaging portions provided to protrude upwardly from a jig body thereof for engaging the opposite side surfaces of the container handle.

2. The apparatus for forming a handle-equipped container according to claim 1, wherein
the container handle is provided with inwardly recessed grooves at the opposite side surfaces thereof, and
the second transport jig has the engaging portions engaged with the grooves to hold the container handle.

3. The apparatus for forming a handle-equipped container according to claim 1, wherein
the transport line has a curved transport portion curved with a predetermined radius, and
the supply section is provided in correspondence with the curved transport portion, and lowers the container handle while rotating the container handle in synchronization with a rotation of the second transport jig in the curved transport portion, thereby supplying the container handle to the second transport jig.

4. A transport jig for use in a transport device for transporting a preform and a container handle to a blow molding section along a transport line, the blow molding section blow-molding the preform, with the preform and the container handle being arranged within a blow cavity, to form a handle-equipped container,
wherein the transport jig supports at least a pair of opposite side surfaces of the container handle to hold the container handle, and
wherein the transport jig further comprises:
a jig body, and
a pair of engaging portions provided to protrude upwardly from the jig body for engaging the opposite side surfaces of the container handle.

5. The transport jig according to claim 4, wherein
the container handle is provided with inwardly recessed grooves at the opposite side surfaces thereof, and
the engaging portions are engaged with the grooves to hold the container handle.

6. A container handle, comprising:
a handle body to be disposed on a barrel of a container along a vertical direction; and
an upper engaging portion and a lower engaging portion provided to protrude laterally from sites near vertically opposite ends of the handle body, and having leading ends engaged with the container,
wherein the upper engaging portion is provided to protrude in a narrower width than the handle body, projections protruding outwardly from opposite side end surfaces of the leading end of the upper protruding portion are provided near the leading end of the upper protruding portion, and grooves are defined on opposite side surfaces of the upper engaging portion by the upper engaging portion, the handle body, and the projections.

7. The apparatus for forming a handle-equipped container according to claim 1, wherein the transport line has a curved transport portion curved with a predetermined radius, and the supply section is provided in correspondence with the curved transport portion, and lowers the container handle while rotating the container handle in synchronization with a rotation of the second transport jig in the curved transport portion, thereby supplying the container handle to the second transport jig.

8. The apparatus for forming a handle-equipped container according to claim 2, wherein the transport line has a curved transport portion curved with a predetermined radius, and the supply section is provided in correspondence with the curved transport portion, and lowers the container handle while rotating the container handle in synchronization with a rotation of the second transport jig in the curved transport portion, thereby supplying the container handle to the second transport jig.

9. The transport jig according to claim 4, wherein the jig body is below the engaging portions which receive the container handle positioned above the jig body and between the engaging portions.

10. The transport jig according to claim 4, wherein the jig body is below the engaging portions which receive the container handle positioned above the jig body and between the engaging portions, and the jig body further comprises means for receiving and supporting the container handle from beneath the handle.

11. The transport jig according to claim 9, wherein the jig body further includes a guide member which guides the handle between the engaging portions.

12. The transport jig according to claim 10, wherein the jig body further includes a guide member which guides the handle between the engaging portions.

\* \* \* \* \*